United States Patent
Kargl et al.

(10) Patent No.: US 8,078,225 B2
(45) Date of Patent: Dec. 13, 2011

(54) COMMUNICATION DEVICE, MOBILE DEVICE AND METHOD OF COMMUNICATION

(75) Inventors: Walter Kargl, Graz (AT); Dietmar Scheiblhofer, Kaindorf (AT)

(73) Assignee: Infineon Technologies AG, Neubiberg (DE)

( * ) Notice: Subject to any disclaimer, the term of this patent is extended or adjusted under 35 U.S.C. 154(b) by 1074 days.

(21) Appl. No.: 11/772,786

(22) Filed: Jul. 2, 2007

(65) Prior Publication Data

US 2009/0011648 A1   Jan. 8, 2009

(51) Int. Cl.
*H04B 1/38* (2006.01)
(52) U.S. Cl. .................. 455/558; 455/550.1; 455/556.2
(58) Field of Classification Search ............... 455/550.1, 455/556.1, 556.2, 557, 558
See application file for complete search history.

(56) References Cited

U.S. PATENT DOCUMENTS

| | | | |
|---|---|---|---|
| 5,887,266 A | 3/1999 | Heinonen et al. | |
| 7,684,415 B2* | 3/2010 | Nakayama et al. | 370/400 |
| 2003/0169699 A1* | 9/2003 | Haardt | 370/316 |
| 2005/0114587 A1* | 5/2005 | Chou et al. | 711/103 |
| 2006/0176903 A1* | 8/2006 | Coulier | 370/466 |
| 2007/0190937 A1* | 8/2007 | Takayama | 455/41.1 |
| 2007/0263595 A1* | 11/2007 | Charrat | 370/351 |

FOREIGN PATENT DOCUMENTS

| | | |
|---|---|---|
| EP | 1 220 496 A2 | 7/2002 |
| EP | 1 679 913 A1 | 7/2006 |
| GB | 2 368 702 A | 5/2002 |
| WO | WO-2007/076456 A2 | 7/2007 |

* cited by examiner

*Primary Examiner* — Nhan Le
(74) *Attorney, Agent, or Firm* — Dickstein Shapiro LLP

(57) ABSTRACT

A communication device having a chip card configured to authorize a communication, the chip card having an interface connected to a communication controller via a modified standardized bus communication, a first and at least one second data source configured to connect to the communication controller.

11 Claims, 4 Drawing Sheets

COMMUNICATION DEVICE, MOBILE DEVICE AND METHOD OF COMMUNICATION

FIELD OF THE INVENTION

The present invention relates to a communication device. In particular the present invention relates to a mobile device, for example a radio, telephone or a computer having expanded communication possibilities.

BACKGROUND OF THE INVENTION

In mobile telephone networks, as for example in the GSM network (global system for mobile communication) or in an UMTS (universal mobile telecommunication system) the identity of the subscriber is stored in a chip card which is often called a SIM card (subscriber identity module). This SIM card is inserted in the mobile apparatus removable, so that the user can receive calls intended for him on the mobile apparatus of his choice by transferring the SIM card from one mobile phone to another.

Today the SIM card exists in two standardized formats. The full sized format corresponds to the size of a credit card while the plug-in format, which is specially adapted to the miniaturized portable telephones is about 25 mm to 10 mm in size. The functionalities of these cards having these two formats are identical.

The SIM cards generally contain data processing means, usually a microcontroller integrated in a chip. On the one hand these processing means contain a zone having a read/write area and a secured memory area which allows the storing of programs and/or files, especially the identification data of the subscriber who possesses the card. On the other hand calculating and processing means are capable of executing various algorithms, particularly algorithms which permit the carrying out of the subscriber identification and of the communication encryption. To communicate to a mobile device a SIM card follows the ISO 7816 smart card standards. In ISO 7816-1 the physical characteristics of a smart card is described. In ISO 7816-2 the location and dimensions of the contact fields are described.

In recent years contactless IC-cards being able to communicate with an IC card reader/writer without physical contact have been put to practical use. The communication of the contactless IC card utilizes electromagnetic waves of the IC card reader/writer, so that when the contactless IC card is away from the IC card reader/writer by a predetermined distance, power is not supplied to the contactless IC card to thereby initialize the mode of the IC card. This allows the IC card to execute communication with another IC card reader/writer.

A near-field radio communication (NFC) technology in which communication is expanded up to interdevice communication using a communication protocol between the contactless IC card and the IC card reader/writer is being brought to attention. That is, in the NFC technology an NFC function is incorporated into mobile phones, digital cameras, PDAs (personal digital assistants), personal computers (PCs), game machines and computer peripheral apparatuses to allow communication of any type of data, as far as the NFC-equipped apparatuses are in a near distance range of, for example, 20 cm or less. In addition incorporating SAM (secure application module) cards into such NFC-equipped apparatuses allow them to serve as contactless IC cards. Those SAM cards for instance unity the function of an SIM card and additional functions for a proprietary NFC communication.

SUMMARY OF THE INVENTION

According to one embodiment of the invention a communication device is provided comprising a chip card configured to authorize a communication, the chip card comprising an interface connected to a communication controller via a modified standardized bus communication, a first data source configured to generate a main data channel and connected to the communication controller via the standardized bus communication, at least a second data source configured to generate at least a second data channel and connected to the communication controller, the communication controller configured to controlling the standardized bus communication and the at least second data channel, wherein the at least second data channel is switched to the modified standardized bus communication and the at least second data channel is transparent for the first data channel.

Furthermore a mobile device comprising a power device configured to supply the mobile device with energy; a first data source configured to generate a first data signal from a first electromagnetic field; an at least second data source configured to generate an at least second data signal from a second electromagnetic field; a chip card configured to authorize a communication to the first and to the second data source via an interface; and a communication controller connected between the interface and the at least two data sources configured to standardized transmit and receive data to and from the first and/or the at least second data source and standardized transmit and receive those data to and from the interface is introduced.

Also a communication controller configured to communicate ISO 7816 norm standardized, wherein the communication controller is plugged in parallel to a standardized bus communication is introduced herein.

Additionally, a method to communicate is introduced, comprising generating a first data stream via a first data source; generating at least one second data stream via a second data source; connecting, by a communication controller, the two data sources transparently to each other to a chip card interface; and authorizing, by the chip card, a communication of the first and second data source.

BRIEF DESCRIPTION OF THE DRAWINGS

The invention is explained below using exemplary embodiments with reference to the drawings, where components which are the same or have the same action are respectively shown with the same reference symbols in the figures. The elements shown are not being considered as true to scale but rather individual elements can be shown exaggeratedly large or exaggeratedly simplified in order to improve understanding.

DESCRIPTION OF THE INVENTION

Figure 1:
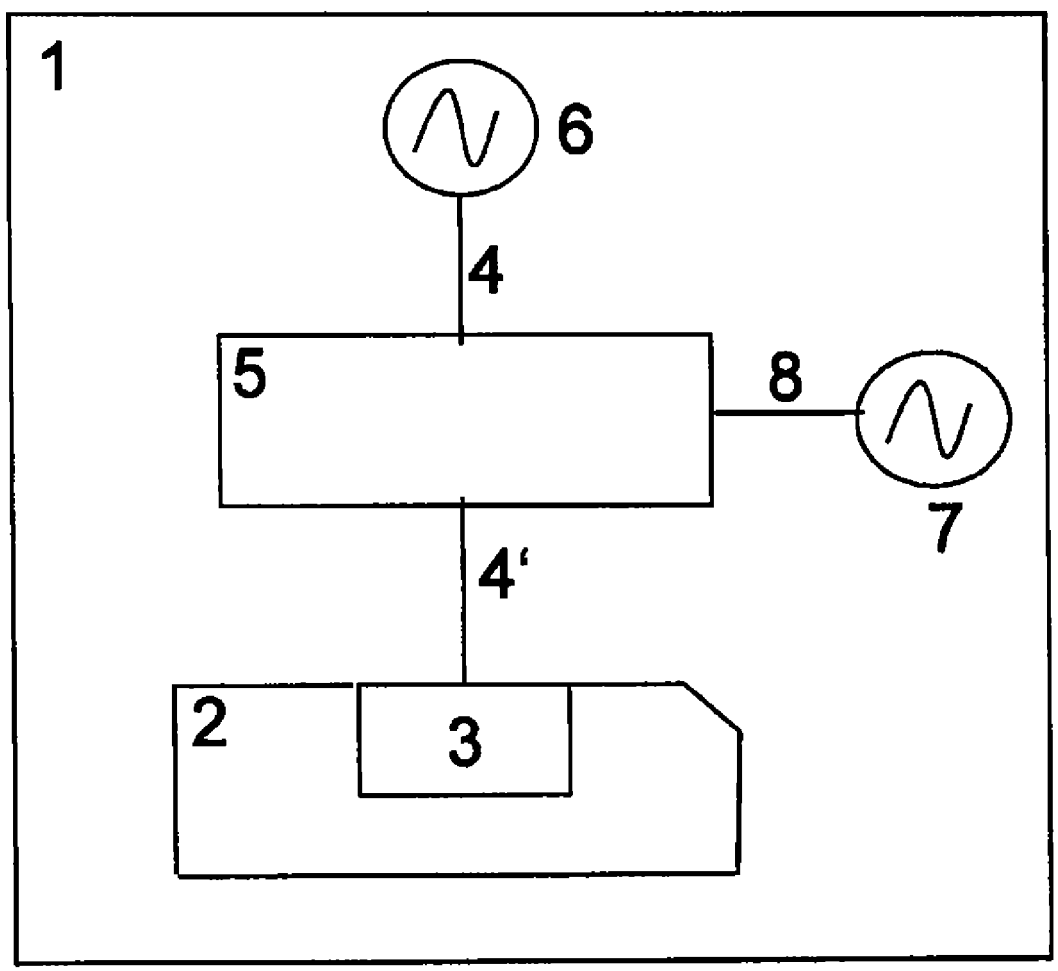
FIG. 1 shows an embodiment of the invention.

FIG. 1 shows a communication device 1 comprising a chip card 2. The chip card is provided with an interface 3 which is connected via a modified standardized bus communication 4' to a communication controller 5. The communication controller 5 therewith is provided with a standardized bus communication 4 to a first data source 6 and a second communication channel 8 to a second data source 7.

The communication device 1 comprises two data sources 6 and 7, wherein each data source 6 and 7 generates a separate bidirectional data channel 4 and 8. The first data source 6 generates a first data channel 4, which is a standardized bus communication signal 4.

The expression data channel herein is meant as a plurality of data signals, which are depend on each other and function as a unit, for instance as a bus communication.

A bus communication signal means a subsystem that transfers data and/or power between different components. A bus can logically connect several peripherals over the same set of wires. Buses can be parallel buses, which carry data words striped across multiple wires, or serial buses, which carry data in bit-serial form. The addition of extra power and control connections, differential drivers, and data connections in each direction usually means that most serial buses have more conductors than two. A master—slave bus communication functions in that way, that an active component, called the master component, mainly controls the bus communication and recognizes buffer overruns, collisions on the bus and so on. The passive parts in a bus communication are called slaves and mainly react instead of act. In case of a mobile device, a SIM card is normally a slave component, wherein the first data source 6, which may represent a base band device, acts as a master. The standardization of a bus communication is explained herein later.

Via the communication controller 5 the first data channel is also applied to the chip card 2 via the interface 3. Advantageously the chip card is an ISO 7816 norm standardized SIM card, which manly acts as authorization module in the communication device 1. A SIM card according to ISO 7816 part 3 uses a standardized communication protocol for bus communication. In this embodiment the chip card 2 is connected to and communicates with the communication controller 5 also via the standardized communication protocol. The interface 3 of the SIM card comprises input and output pins for following signals: positive voltage, reset, clock, ground and a minimum of one I/O signal. As mentioned above, a chip card 2 in the sense of the invention is a slave component in the given bus topology.

Another data source 7 is also implemented in the communication device 1. The second data source 7 is also connected to the communication controller 5 and applies a second data channel 8 to it. In comparison to the bus communication 4 the data channel 8 does not have to be standardized, but advantageously is. The communication controller 5 switches both data channels to the modified standardized bus communication 4' to the chip card 2.

The switching of both channels together is managed by the communication controller 5. Its main task is the transparently switching, which means, that the first data channel 4 does not recognize the existence of a second data channel 8. This is mainly reached by means of multiplexing methods in the communication controller 5. The communication controller has "switch" functionality, which means, different frequencies of different data protocols and different transmitting speeds are linked together via this communication controller 5. A necessary buffering of the different data channels is also managed by the communication controller 5.

For instance a simple time division multiple access (TDMA) mode is used. It allows several components to share the same frequency channel by dividing the data channel into different timeslots. The components transmit in rapid succession, one after the other, each using its own timeslot. This in general allows multiple stations to share the same transmission medium while using only the part of its bandwidth they require.

Another possibility is a frequency division multiple access (FDMA) mode. In an FDMA scheme, the given radio frequency bandwidth is divided into adjacent frequency segments. Each segment is provided with bandwidth to enable an associated communications signal to pass through a transmission environment with an acceptable level of interference from communications signals in adjacent frequency segments.

A further possibility is the switching of the channels in code division multiple access (CDMA) mode. That divides up a radio channel not by time (as in TDMA), nor by frequency (as in FDMA), but instead by using different pseudo-random code sequences for each user. CDMA is a form of "spread-spectrum" signaling, since the modulated coded signal has a much higher bandwidth than the data being communicated.

However these three switching methods described before are just mentioned as examples and not explained in greater details herewith. Other practical and/or fitting methods for transparently switching may also be used.

In case a bus communication 4, respectively 4' between the first data source 6 and the chip card 2 is established, neither the chip card 2 nor the first data source 6 have to stop the communication 4 to each other, when the second data source 7 is switched to the bus communication 4.

The bus communication 4' between chip card 2 and communication controller 5 is called modified, because their original data channel may be delayed or transmitted in fragments in case the second data channel is switched to the bus communication. The original bus communication 4 is then modified 4'.

Furthermore the modified bus communication 4' is still standardized, like the bus communication 4. A typical standard in mobile device while communication and authorization to a chip card 2 is necessary or needed, the ISO 7816 norm is applied. A typical ISO 7816 standard bus communication contains five typical signals explained above.

One main advantage of this embodiment of the invention is the usage of the existing interface 3 in the chip card 2. In case a SIM card is used, the interface has not to be broadened and/or another interface has to be applied to it, to communicate to more than one data source. Therefore, a standardized SIM card (ISO 7816) can be used without any modifications. The application software running on the chip card 2 can be modified in that way to distinguish between the different data source 6, 7 and authorize or generally communicate to each data source 6, 7 independently over one interface 3.

It may be mentioned, that the invention is not limited to data sources in a mobile device. A plurality of data sources may be managed by communication controller 5.

Figure 2:
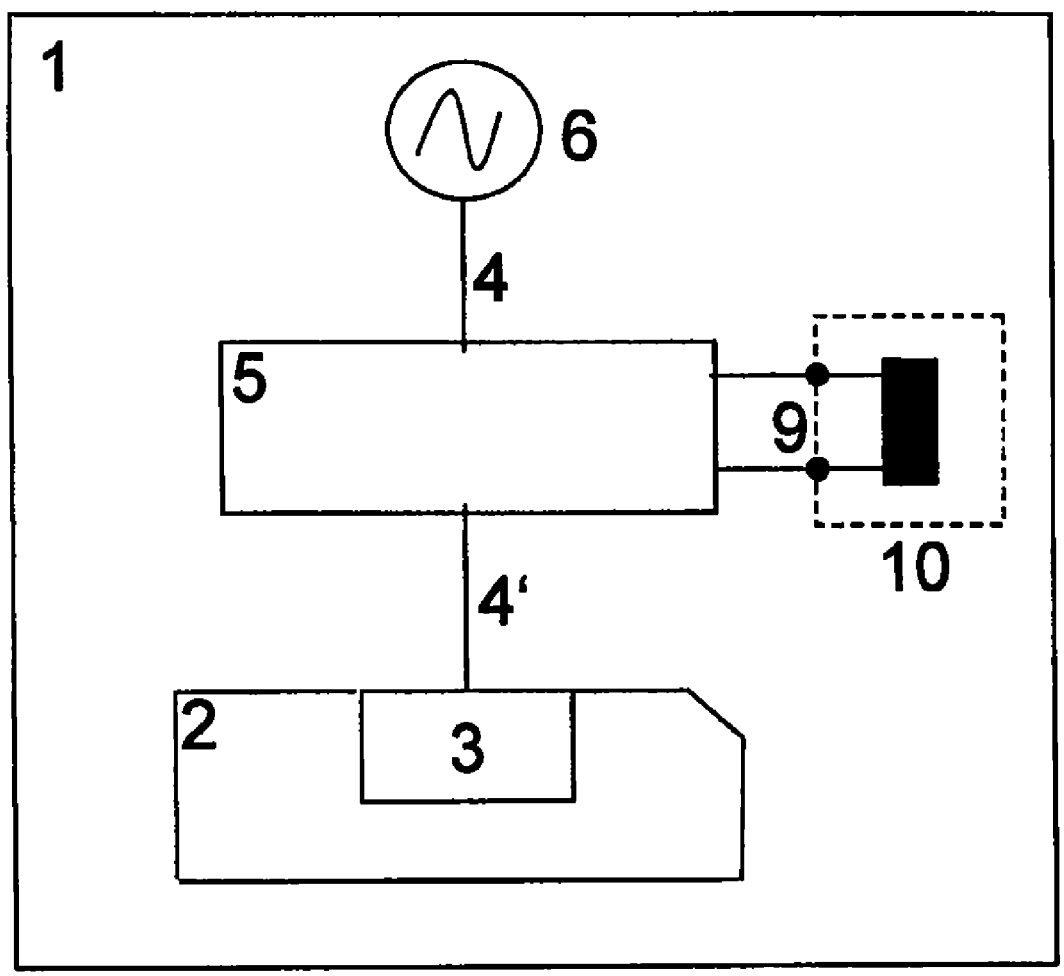
FIG. 2 shows a more detailed drawing of the embodiment of FIG. 1.

In FIG. 2 a more detailed drawing of the embodiment of FIG. 1 is shown. FIG. 2 is different in that a coil can be plugged to the communication controller instead of the second data source. Therewith the communication controller comprises means of input pins 9 for e.g. a NFC-coil.

In order to unify a normal mobile device with a NFC communication function, the second data source 7 of FIG. 1 is now represented by means of a NFC coil. This coil may be integrated in the communication device cover. This coil is able to receive electromagnetic waves of a card reader/writer (not shown), when the mobile device 1 is in predetermined distance to this card reader/writer device.

The communication controller 5, which herewith is plugged in parallel to the existing data channel 4 of the first data source 6 now furthermore contains means for converting these electromagnetic waves to the at least second data channel 8. This second data channel 8 is also switched via TDMA, FDMA or CDMA to the existing data channel of data source 6 transparently. An explanation can be found in the description of FIG. 1. The NFC components are passive components and therewith comparable with the chip card 2 and act as slave in the bus communication. In order an authorization from the chip card 2, which may be a standard SIM card (ISO 7816-3), via NFC is necessary a communication 4' gets established transparently to the existing data channel 4, via communication controller 5. This may allow a user of such a mobile device to phone via satellite and/or terrestrial radio communication, represented by the first data source 1, and synchronously crossing a NFC portal with a further authorization of the SIM card. The main advantage is the use of a SIM card 2 with a standardized ISO 7816 interface 3 and no additional interface, for instance an interface working with any single wire protocol (SWP).

Figure 3:
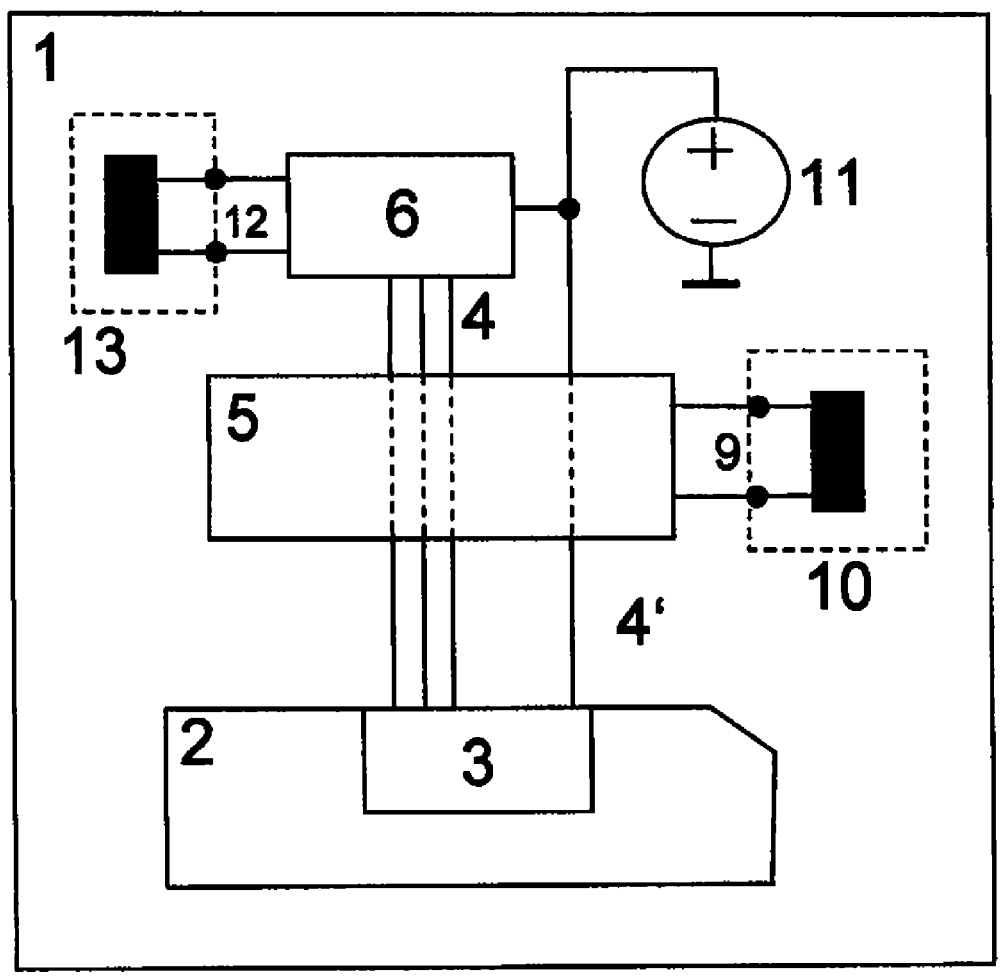
FIG. 3 shows another detailed and less simplified drawing of the embodiment of FIG. 1.

FIG. 3 illustrates a less simplified drawing of the embodiment of FIG. 1. In comparison to FIG. 1, the standardized bus communication 4 and 4' are herein illustrated in greater detail with the clock signal, the reset signal, at least one I/O signal and the positive DC voltage which is generated by a DC source 11. These signal lines are drawn as dotted lines, while crossing the communication controller 5 for representing the plug-in feature of the communication controller 5 to an existing data channel between the first data source 6 and the chip card 2 with the interface 3. The DC source 11 also supplies the data source 6 which now also comprises input pins 13 for a coil 12. The coil 12 is also not explicit part of the invention and may be integrated into mobile device coverage as well.

The communication controller 5 in turn switches the second data source, represented now by input coil 10 receiving electromagnetic waves from a card reader/writer (not shown) when in predetermined distance, via input pins 9 of the communication controller 5 transparently to the existing data channel 4 to a modified standardized bus communication 4'. Primary, the communication controllers' task 5 is the switching of two data channels to one standardized bus communication 4' and secondly the task of converting received NFC electromagnetic waves into a second data channel 8.

In this detailed drawing of the embodiment the data source 6 is represented by a base band device 6. This base band device 6 is a master unit in the bus communication 4 and controls it. While receiving electromagnetic waves with coil 13 and input pins 12, the base band device 6 converts the electromagnetic waves to a first data channel 4. To authorize a communication via base band device 6 it is necessary to establish a communication from the base band device 6 to the chip card 2, which again might preferably be a SIM card in this embodiment. The task of the SIM card is an authorization to the base band device 6 which allows a user to use the mobile device 1 for telephone and/or satellite/terrestrial network functions.

In case the mobile device 1 now receives a NFC signal which is represented by the second coil 10 and the input pins 9, this signal is converted into a second data channel inside the communication controller 5. Afterwards this second data channel is switched to the existing first data channel 4 via communication controller 5. Thereby the at least second data channel from the NFC device is transparently switched to the standardized bus communication 4, which means that a base band device 6 will never recognize that an NFC device is in receiving range. The main advantage now is that the standardized bus communication 4 between the communication controller 5 and the chip card 2 is standardized on ISO 7816 norm. It is therefore not necessary to use a second interface to communicate to the chip card 2 and use another second protocol e.g. SWP, too.

The advantage of the above described embodiments of the invention thereby is that the chip card 2 is a normal SIM card which is nowadays used in standard mobile phones. The communication controller 5 furthermore is a hardware plug-in, which may be plugged in parallel to the existing standardized bus communication 4. The modified standardized communication 4' is mainly reached while TDMA, FDMA or CDMA modes are run inside the communication controller 5. This means the communication controller 5 is multiplexing both data channels 4 and to the chip card 2. Buffering is also managed by the communication controller 5. No extra interface is necessary therewith.

The chip card 2 recognizes via software routines, which data channel needs to be authorized and reacts respectively. This recognition is a complete software handling without changing any hardware inside the chip card 2. In case a NFC authorization is needed, the base band communication between base band device 6 and chip card 2 may be buffered.

Figure 4:
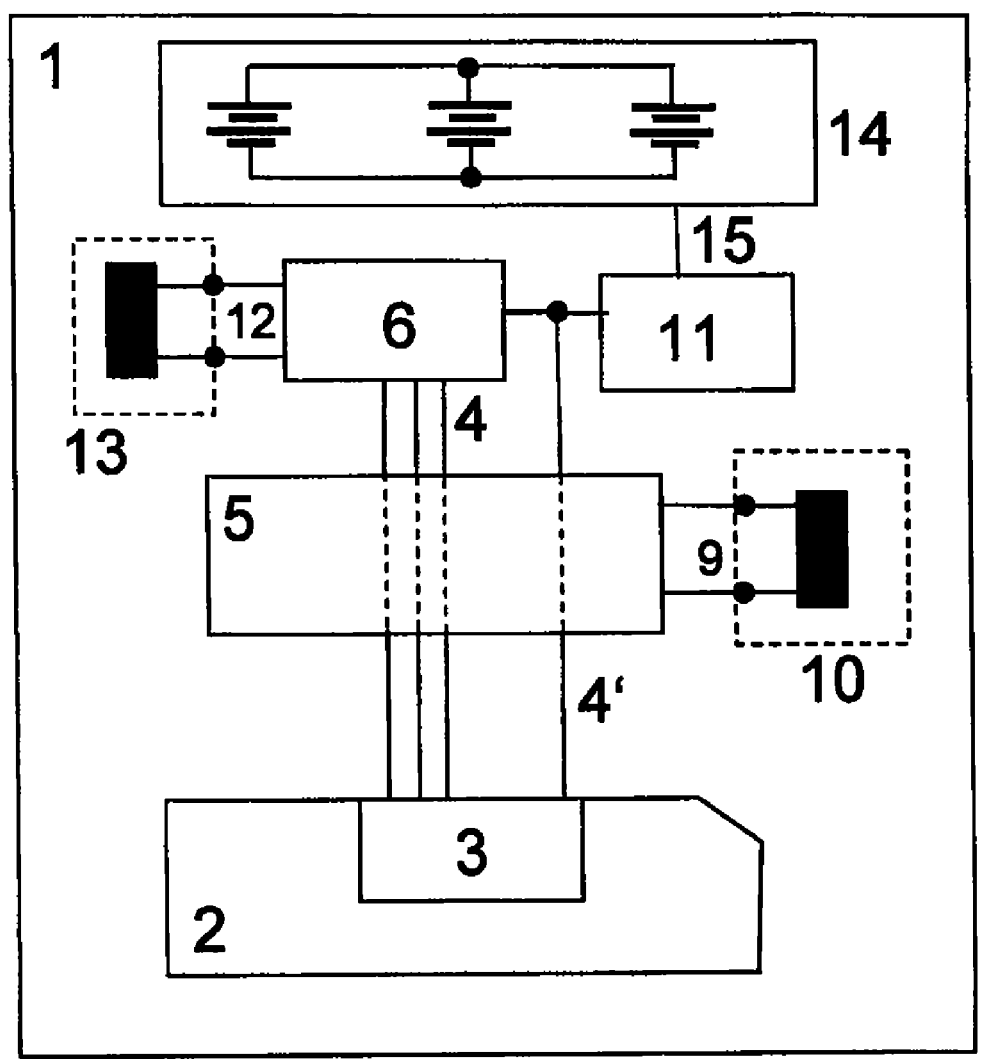
FIG. 4 shows another detailed drawing of the embodiment of FIG. 3.

In FIG. 4 another detailed drawing of the embodiment of FIG. 1 is shown. The DC source 11 is herein changed by a battery 14 which generates a battery output signal 15 for supplying a power IC 11. This power IC 11 mainly supplies the communication controller 5, the base band device 6 and the chip card 2. The other components are also found and described in FIG. 3. A detailed description herein is therefore not necessary.

To clarify the statement "data channel", it mainly means a plurality of data signals, which are summarized in a bus communication and are a bidirectional link between a data source and its peripherals. In case of a standardized ISO 7816 norm it comprises a positive voltage signal, a ground signal, a clock signal, a reset signal and an input output (I/O) signal. The I/O signal is mainly a serial data connection to authorize a communication firstly to the base band device and also to NFC. The expression data channel is equal in the sense of the expressions data stream, communication channel and bus communication herewith.

The aim of the above described embodiments of the invention is a more comfortable use of a mobile phone; the therein standardized SIM card can be used to authorize a communication to a base band signal and also to a NFC signal.

The embodiment herein is described with two data channels, but the communication controller is not limited to just two data channels and may manage a plurality of data channels.

The received electromagnetic waves received by the different input pins 9 and 12 may be mainly different in carrier frequency, kind of modulation, signal strength and data content. They may include voice signals and/or data signals.

The expression mobile device herein is meant to be a long-range, portable electronic device used for mobile communication. In addition to the standard voice function of a telephone, current mobile devices can support many additional services such as SMS for text messaging, email, packet switching for access to the Internet, and MMS for sending and receiving photos and video. Most current mobile phones connect to a cellular network of base stations (cell sites), which is in turn interconnected to the public switched telephone network (PSTN) (the exception are satellite phones).

To connect to a base station a base band device is included in the mobile device which comprises means of IC devices, which converts an incoming electromagnetic wave into voice or data.

What is claimed is:

1. A communication device comprising:
   a SIM card configured to authorize a communication, wherein the SIM card comprises an interface connected to a communication controller via a modified standardized bus communication;
   a first data source configured to generate a first data channel and connected to the communication controller via a standardized bus communication; and
   at least one second data source configured to generate at least one second data channel and connected to the communication controller,
   wherein the communication controller is configured to control the standardized bus communication and the at least one second data channel, wherein the at least one second data channel is switched to the modified standardized bus communication and the at least second data channel is transparent for the first data channel.

2. The communication device according to claim 1, wherein the first data source is a base band communication device.

3. The communication device according to claim 2, wherein the at least one second data source is a near field communication device.

4. The communication device according to claim 3, wherein the standardized bus communication and the modified standardized bus communication is standardized by ISO 7816 norm.

5. The communication device according to claim 4, wherein the SIM card is an ISO 7816 standardized SIM card.

6. The communication device according to claim 5, wherein the communication controller comprises the near field communication device.

7. The communication device according to claim 6 further comprising an energy device, wherein the communication controller and the first data source are supplied with energy via the energy device.

8. The communication device according to claim 6, wherein the communication controller comprises input pins configured to connect a near field communication input antenna.

9. The communication device according to claim 1, wherein the communication controller switches the at least second data channel in a time and/or frequency division multiple access mode to the standardized bus communication.

10. The communication device according to claim 1, wherein the communication controller switches the at least second data channel in a code division multiple access mode to the standardized bus communication.

11. A communication device comprising:
    a SIM card means for authorizing a communication, wherein the SIM card means comprises an interface connected to a communication controller via a modified standardized bus communication;
    a first data source means for generating a first data channel and connected to the communication controller via a standardized bus communication; and
    at least one second data source means for generating at least one second data channel and connected to the communication controller,
    wherein the communication controller is configured to control the standardized bus communication and the at least one second data channel, wherein the at least one second data channel is switched to the modified standardized bus communication and the at least second data channel is transparent for the first data channel.

* * * * *